3,186,301
MISSILE RELEASE SYSTEM
Herbert H. Buschers, Riderwood, Md., assignor to Martin-Marietta Corporation, Baltimore, Md., a corporation of Maryland
Filed Apr. 24, 1962, Ser. No. 189,742
9 Claims. (Cl. 89—1.7)

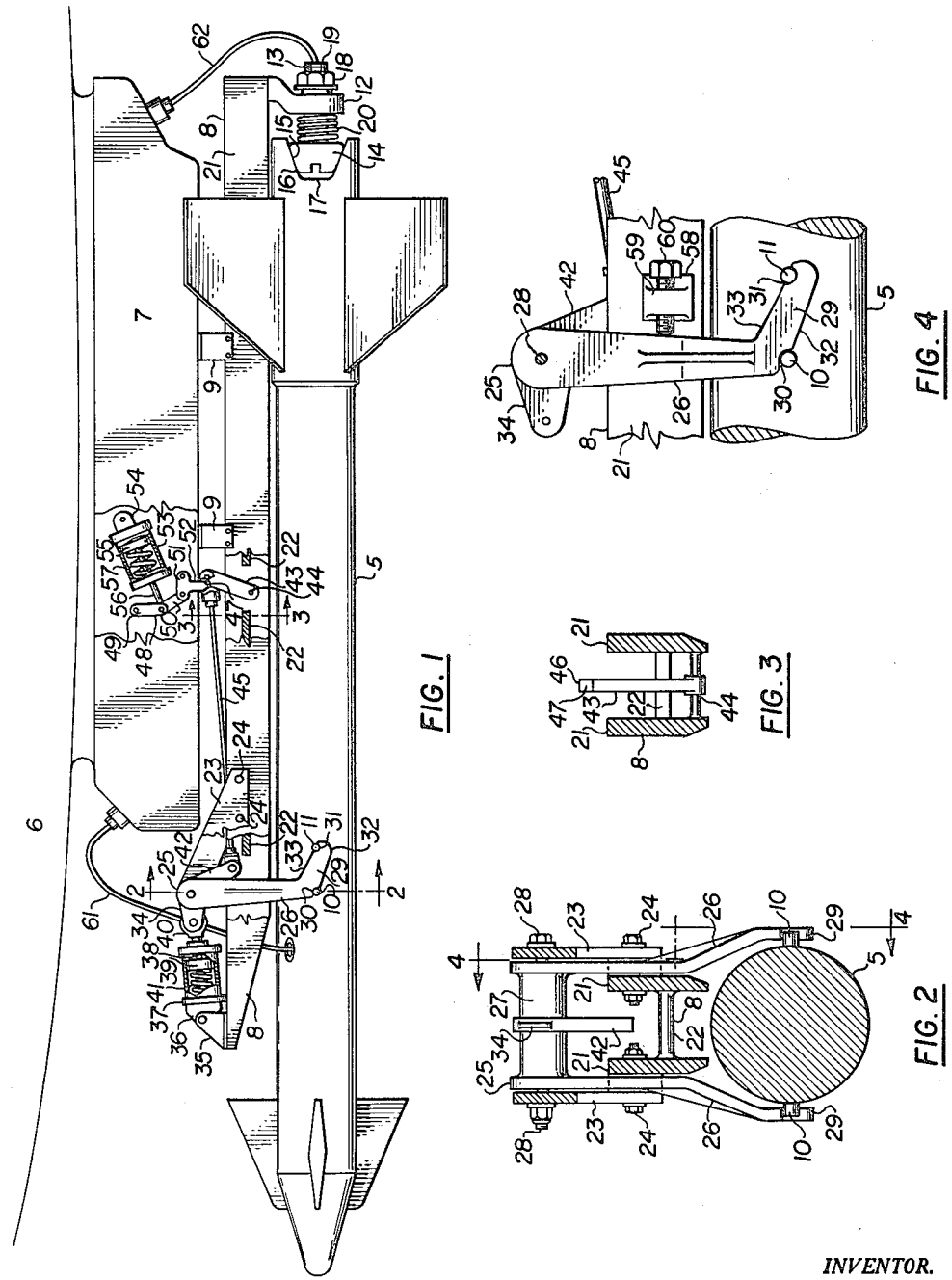

This invention relates to a missile release system and more particularly to such a system which does not degrade the aerodynamic characteristics of the missile and which is universally applicable for the launching of all types of missiles.

With the advent of the missile as a major defense weapon, engineers have been confronted with the problem of designing systems facilitating the launch or release of such weapons. Naturally one of the design goals has been to produce an inexpensive release system, but even more important has been the requirement to produce a reliable and foolproof system which does not degrade the performance of the missile.

Missiles are presently being used for many military missions. For instance they are frequently categorized as being either of the air-to-ground, air-to-air, ground-to-air or ground-to-ground type. The approach to date in providing missile release systems has been to design specialized release mechanisms for each particular missile. No release system has heretofore been devised, the principles of which are universally applicable for use with all missiles regardless of type or size. This situation has resulted in excessive engineering and production costs and, in addition, in excessive costs associated with the training of operating personnel.

The significance of the present invention may best be realized by a brief review of the typical missile release systems in use today. A popular type of system which has found particular application in launching medium range ground-to-ground missiles is that commonly referred to as the "ball and socket" type of release system. It consists basically of a yoke pivotally mounted on a launcher. The arms of the yoke are designed to receive the forward section of the missile therebetween and the ends of the yoke arms are provided with balls which engage sockets provided in the surface of the missile. As the missile initially moves forward under thrust on the launcher, the yoke pivots with this motion to a point where the balls become disengaged from the sockets. It will be obvious from the above brief description that the sockets disrupt an otherwise smooth surface and degrade the aerodynamic characteristics of the missile.

Many release systems have utilized a shear pin which incorporates an explosive charge. The shear strength of a pin prevents the forward motion of the missile in the launcher prior to actual launch. In many instances, other than when it is desired to effect a launch of the missile, forces may be expected to act on the missile tending to move it forward on the launcher. An example of such a case would be a test run of the missile engine. Consequently, the normal shear strength of the pin must be sufficient to resist such forces. At the same time, the force required to overcome the normal shear strength of the pin at launch often represents an excessive amount of the thrust developed by the engine. Consequently, an explosive charge is incorporated into the shear pin so as to discharge at the moment of launch, thereby shattering the pin and permitting effective utilization of the full thrust developed by the missile engine. Systems including such a feature obviously have serious limitations as to their ability to perform in a reliable and safe manner.

Missiles launched from the underside of airplane wings are normally provided with collars which embrace the forward section of the missile. These collars in turn are provided with lugs which engage guide rails attached to the wing. When the missile is fired, the lugs slide forward along the guide rails to a point at which they become disengaged therefrom. The primary disadvantage of such a system is that the collars and associated lugs are permanently attached to the missile body and consequently adversely affect the aerodynamic characteristics of the missile.

At the time when missiles traveled at only subsonic speeds, alterations made to the otherwise smooth missile surface to facilitate the launching of the missile did not degrade the aerodynamic characteristics of the missile to any serious extent. However, most of today's missiles fly at supersonic speeds and virtually any alteration of their surface presents an aerodynamic condition which cannot be tolerated. While it is true that a missile release system has heretofore been designed that does not alter the smooth surface of the missle, this system is only applicable for use under certain conditions. In the system referred to and which was designed for the release of air-to-air missiles, the forward end of the missile is supported from the aircraft wing by its tail fin assembly. This is accomplished by providing a tail fin assembly which is slideably mounted on the body of the missile. When the missile is attached to the wing of the aircraft, this tail fin assembly is in a forward position on the missle body and one or more of the fins is connected to a bracket projecting from the underside of the wing, thereby supporting the missile. When the missile is fired, the main body of the missile moves forward sliding through the tail fin assembly to a point at which a tapered section of the aft end of the missile body engages the tail fin assembly which is then carried by the missile body. Although this type of system is satisfactory for use in selected applications, it is not acceptable for use with any type of guided missile.

It is therefore the primary object of this invention to provide a missile release system which will facilitate missile launches without necessitating the degradation of the aerodynamic characteristics of the missile. Another object of this invention is to provide a missile release system which may be universally employed to launch any type of missile from any attitude. An additional object of this invention is to provide a simple and extremely reliable system for the zero-length launch of missiles. These and other objecs and advantages of this invention will become apparent as the following description is read in connection with the accompanying drawings in which:

FIGURE 1 is a vertical longitudinal view, partially cut away, showing an apparatus incorporating the principles of this invention and supporting a missile from the underside of an aircraft wing, FIGURE 2 is a sectional view taken along line 2—2 in FIGURE 1, FIGURE 3 is a sectional view taken along line 3—3 in FIGURE 1, and FIGURE 4 is a sectional view taken along line 4—4 in FIGURE 2.

The basic principle of the missile release system herein provided is in rotatably mounting a yoke to a launcher frame, the arms of which receive the forward section of the missile therebetween and are provided with flanged end portions containing recesses which engage pins provided on the missile body. The missile is thereby supported from any motion in a direction normal to its longitudinal axis prior to its being fired and the flanged end portions of the yoke are further constructed so that they will become disengaged from the pins as the missile moves forward upon being fired. The pins extend only a short distance beyond the outer surface of the missile body and are well within the laminar air flow so as not to have any adverse effect on the aerodynamic characteristics of the missile.

Referring first to FIGURE 1 in detail, there is illustrated an apparatus built in accordance with the principles of the present invention to facilitate the launching of a missile 5 from the underside of an aircraft wing 6. Supported by any suitable means from the underside of the aircraft wing 6 is a launcher 7. Although the launcher 7 does not constitute part of the present invention, such devices are normally required to furnish the proper guidance signals, firing signals, and other necessary intelligence to the missile. A launcher frame 8 is suspended from the launcher 7 by a plurality of brackets 9 or any other suitable means.

Extending from the outer surface of the missile 5 are two sets of pins, each set consisting of a forward pin 10 and an aft pin 11. These sets of pins are located on the missile 5 well forward of its center of gravity. As illustrated in FIGURES 1 and 2, the two forward pins 10 are diametrically disposed on the missile 5 with respect to each other and the two aft pins 11 are similarly diametrically disposed with respect to each other. While this is the preferred arrangement of the pins for many missiles, it may be found desirable to use other arrangements for certain applications. For example, in the case of a missile of relatively large diameter, it will be more practical to locate all of the pins on the top portion of the missile body; however, the two sets of pins would still be located on the opposite sides of the vertical plane passing through the missile's longitudinal axis. These pins are connected to the missile structure by any suitable means and, as will be explained later in more detail, extend only a short distance beyond the surface of the missile 5.

Mounted on the underside of the aft end of the launcher frame 8 is a projection 12, said projection being provided with a cylindrical bore passing therethrough so as to slideably receive a plug 13. The head 14 of the plug 13 has an annular edge 15 which is tapered so as to seat against the inner surface 16 of the missile exhaust chamber 17. A nut 18 cooperates with threads provided on the end 19 of the plug 13 to seat against the projection 12. Disposed around the plug 13 and between the head 14 thereof and the projection 12 is a spring 20.

As can be better seen by reference to FIGURE 2, the launcher frame 8 includes two vertical members 21 connected by a cross member 22. Support plates 23 are mounted to the launcher frame 8 by a plurality of bolts 24. A yoke 25, having a pair of arms 26 connected together by a cylindrical member 27, is rotatably mounted to the support plates 23 by a bolt 28 which passes through a cylindrical bore provided in the cylindrical member 27. Spacing members (not illustrated) are imposed between the two vertical members 21 of the launcher frame 8 and the support plates 23 so as to permit the arms 26 of the yoke 25 to be disposed between the vertical members 21 and the support plates 23 and to rotate around the bolt 28. The arms 26 of the yoke 25 are formed so as to receive the forward section of the missile 5 therebetween. The outer ends of the arms 26 are provided with flanged portions 29. Each of these flanged portions 29 contain a circular recess 30 and a circular recess 31, the recess 30 being provided on the outer-face 32 of the flanged portion 29 at the heel thereof and recess 31 being provided on the inner-face 33 of the flanged portion at the toe thereof. These circular recesses 30 and 31 are sized to snugly receive the pins 10 and 11 on the missile 5. It will be seen that when the missile 5 is positioned within the arms 26 of the yoke 25 with the pins 10 and 11 seated in the circular recesses 30 and 31, respectively, the forward end of the missile 5 is restrained from movement in any direction normal to its longitudinal axis.

A crank arm 34 is formed integral with the cylindrical member 27. A bracket 35 is attached by any suitable means to the forward end of launcher frame 8 and is formed so as to pivotally receive one end 36 of a cylinder 37. Slideably mounted within the cylinder 37 and connected to one end of a piston rod 38 is a piston 39. The piston rod 38 extends through the cylinder 37 and has its other end 40 pivotally connected to the crank arm 34. Positioned within the cylinder 37 is a spring 41 which exerts a force on the yoke 25 through the piston rod 38 and the crank arm 34 tending to rotate the arms 26 in a forward direction with respect to the launcher frame 8.

Referring to FIGURES 1 and 3, a second crank arm 42 is formed integral with the cylindrical member 27. A lever 43 is rotatably mounted to a pin 44, which is supported by the two vertical members 21 of the launcher frame 8. A rod 45 connects the crank arm 42 to the lever 43, being pivotally connected to each of these members. The end 46 of the lever 43 is provided with an offset bearing surface 47.

Contained within the launcher 7, which as previously stated does not constitute part of the present invention, is a mechanism 48 comprising links 49, 50 and 51 which are pivotally joined in series relationship, the loose ends of the links 49 and 51 being rotatably mounted to the structure of the launcher 7. The link 51 is provided with a trigger 52 which engages the offset bearing surface 47 of the lever 43. A cylinder 53 has one end 54 thereof pivotally connected to the structure of the launcher 7 and contains a piston 55 slideably mounted therein. One end of a piston rod 56 is connected to the piston 55 and the other end thereof extends through the cylinder 53 and is pivotally connected to the links 49 and 50. Restrained within the cylinder 53 so as to exert a force in the aft direction through the trigger 52 on the lever 43 is a spring 57. It will be seen that this force in turn is transferred in an aft direction on the aft pins 11 of the missile 5 through the rod 45, and the crank arm 42 and the yoke 25.

As shown in FIGURE 4, a bracket 58 is mounted on the outer-face of each of the vertical members 21 of the launcher frame 8. A flange 59 of each of the brackets 58 is provided with a threaded cylindrical bore which receives a set screw 60. The force exerted on the yoke 25 by the spring 57 causes the arms 26 of the yoke to seat against the set screws 60. At the same time the brackets 58 are so located on the launcher frame 8 and the set screws 60 so adjusted that, when the missile 5 is mounted in the missile release system herein provided, the spring 20 is compressed to an extent which assures the proper seating of the inner surface 16 of the missile exhaust chamber 17 on the head 14 of the plug 13.

As may be seen in FIGURE 1, the cross member 22 of the launcher frame 8 is not continuous along the whole length thereof, but rather is interrupted in the vicinity of the lever 43 to permit this member to pivot on the pin 44, and terminates at its forward end at a point where it does not interfere with the movement of the crank arm 42.

Control signals, power, etc. are furnished to the missile 5 from the launcher 7 prior to launch through the umbilical cord 61. The missile 5 is fired at the proper time by an electrical signal furnished to the missile from the launcher 7 through a cable 62.

Before take-off the missile 5 is mounted from the launcher 7 by the missile release system herein provided. This is accomplished by seating the inner surface 16 of the missile exhaust chamber 17 on the head 14 of the plug 13 and against the force of the spring 20 so that the pins 10 and 11 are received into the circular recesses 30 and 31, respectively, of the flanged portions 29 of the arms 26 with the offset bearing surface 47 of the lever 43 engaging the trigger 52. The missile 5 is restrained from movement in the fore and aft direction with respect to the launcher frame 8 prior to firing by the force exerted on the yoke 25 by the spring 57 causing the arms 26 of the yoke to seat against the set screws 60. The missile 5 is restrained from movement in any direction normal to its longitudinal axis by the novel arrangement of having the pins 10 and 11 spaced from each other along the length of the missile 5 and seating in the recesses 30 and 31 provided in the opposite faces of the flanged portions 29 of the arms 26 and, further, by the novel arrangement whereby the missile exhaust chamber 17 seats on the annular edge 15 of the plug 13.

In a typical application, the device shown is used to launch an air-to-ground missile which develops a 7000 pound thrust at firing. A 32 pound spring 20 was employed on the plug 13. The spring 57 was selected so that it resulted in a total force of approximately 600 pounds being exerted against the set screws 60 and the spring 20. When the missile was fired, the developed thrust easily overcame this 600 pound force and the lever 43 tripped the trigger 52, thereby permitting the missile to move forward.

Once the trigger 52 has been tripped the force exerted on the yoke 25 by the spring 41 causes the yoke to rotate out of the flight path of the missile tail fins and to be thereafter held in a relative horizontal position as the piston 39 seats against one end of the cylinder 37. In the typical application mentioned in the preceding paragraph, the spring 41 was selected so that it caused a total force of 40 pounds to be exerted on the forward pins 10 in a forward direction. This forward rotation of the yoke 25 occurs simultaneously with the forward movement of the missile 5 and the contour of the outer-faces 32 of the flanged portions 29 of the arms 26 permit the yoke 25 to become automatically disengaged from the pins 10 and 11. Shortly thereafter the umbilical cord 61 and the cable 62 become disconnected from the missile 5, which is then completely released from the aircraft and free to fly its prescribed course. The missile's otherwise smooth surface is only disrupted by the pins 10 and 11 which are well within the missile's laminar air flow, extending only approximately ¼ inch beyond the surface of the missile in the application previously referred to, and, consequently, have no affect on the aerodynamic characteristics of the missile.

The force exerted on the yoke 25 by the spring 41 causes the yoke to rotate out of the path of the tail fins when the missile is fired and also performs the function of locking the yoke in a relatively horizontal position thereafter, so that it will not flop around on the bolt 28. In many instances the initial thrust developed by the missile engine is itself sufficient to cause the yoke to rotate out of the path of the missile's tail fins and thereby to perform the first function of the spring 41. In such cases the cylinder 37 and its cooperating members may be eliminated and a more simple device employed to lock the yoke in an "up" position after it has rotated out of the flight path of the missile's tail fins.

As indicated, the launcher 7 does not constitute part of this invention and has only been illustrated in the drawings in order that a complete understanding of the present invention may be had. The particular launcher illustrated includes the mechanism 48, the cylinder 53, the piston 55, the piston rod 56 and the spring 57. The particular embodiment of the present invention illustrated in the drawings has been designed to operate with the launcher 7 and consequently includes the lever 43, the pin 44, the rod 45 and crank arm 42 which cooperate with the aforementioned components of the launcher 7 to cause the arms 26 of the yoke 25 to seat against the set screws 60 so as to prevent any moment of the missile 5 in a fore or aft direction with respect to the launcher frame 8 prior to the firing of the missile. It will be obvious that in many applications of this invention, such as in the vertical launch of ground-to-ground or ground-to-air missiles, the dead weight of the missile itself will serve this function and that, in such cases, the lever 43, the pin 44, the rod 45 and the crank arm 42 would not be required. It also would not be necessary to provide a spring 20 as the plug 13 could then be mounted in a fixed relationship to the launcher frame 8. In addition the brackets 58 and set screws 60 could be eliminated.

The type of launcher illustrated often includes means (not shown) for locking the piston rod 56 except under conditions when an actual launch of the missile is anticipated. When the piston rod 56 is so locked, a force much greater than the 600 pound force referred to in the specific application of this invention previously discussed would be required before the lever 43 could trip the trigger 52. Such a locking device will prevent an accidental release of the missile, which might otherwise occur under such circumstances as crash landings.

This invention may be embodied in other ways without departing from the spirit or essential characteristics thereof. The embodiments of the invention described herein are therefore to be considered as in all respects illustrative and not restrictive, the scope of the invention being indicated by the appended claims, and all changes which come within the meaning and range of equivalency of the claims are intended to be embraced therein.

The invention claimed is:

1. A missile release system for the zero length launching of a missile having two sets of pins mounted to the missile body on the opposite sides thereof substantially forward of the center of gravity of said missile and extending beyond the surface thereof, each set of pins consisting of a forward and an aft pin, comprising: a launcher frame; means pivotally mounted to said launcher frame and cooperating with said pins so as to support said missile from movement in any direction normal to the longitudinal axis of said missile prior to the firing of said missile and so as to become disengaged from said pins as said missile moves forward upon being fired without imparting any moment to said missile; a second means for preventing said first means from rotating in either direction prior to the firing of said missile thereby to restrain said missile from movement in a fore or aft direction with respect to said launcher frame, said second means being operable immediately upon firing said missile to permit the forward rotation of said first means; and a third means cooperating with said first means to cause said first means to rotate out of the flight path of the missile tail fins as said missile moves forward upon being fired.

2. A missile release system for the zero length launching of a missile having two sets of pins mounted to the missile body on the opposite sides thereof and extending beyond the surface thereof, each set of pins consisting of a forward and an aft pin, comprising: a launcher frame; means pivotally mounted external to said missile body and cooperating with said pins so as to support said missile from movement in any direction normal to the longitudinal axis of said missile prior to the firing of said missile and so as to become disengaged from said pins as said missile moves forward upon being fired without imparting any moment to said missile; a second means for preventing said first means from rotating in either direction prior to the firing of said missile thereby to restrain said missile from movement in a fore and aft direction with respect to said launcher frame, said second means being operable immediately upon firing said missile to permit the forward rotation of said first means; a third means cooperating with said first means to cause said first means to rotate out of the flight path of the missile tail fins as said missile moves forward upon being fired; and a fourth means acting against the tail section of said missile to further support said missile from movement in any direction normal to the longitudinal axis of said missile and so as to permit forward movement of said missile upon the firing of said missile.

3. A missile release system for the zero length launching of a missile having two sets of pins mounted to the missile body on the opposite sides thereof and extending beyond the surface thereof, each set of pins consisting of a forward and an aft pin, comprising: a launcher frame; means pivotally mounted to said launcher frame and cooperating with said pins so as to support said missile from movement in any direction normal to the longitudinal axis of said missile prior to the firing of said missile and so as to become disengaged from said pins as said missile moves forward upon being fired without imparting any moment to said missile, said means adapted to be rotated out of the flight path of the missile tail fins by the force of the forward thrust resulting from firing said missile; a second means for preventing said first means from rotating in either direction prior to the firing of said missile thereby to restrain said missile from movement in a fore or aft direction with respect to said launcher frame, said second means being operable immediately upon firing said missile to permit the forward rotation of said first means; and a third means acting against the tail section of said missile to further support said missile from movement in any direction normal to the longitudinal axis of said missile and so as to permit the forward movement of said missile upon the firing of said missile.

4. In a missile release system for the zero length launching of a missile having two sets of pins mounted to the missile body on the opposite sides thereof and extending beyond the surface thereof, each set of pins consisting of a forward and an aft pin, the improvement comprising: a launcher frame; and a yoke pivotally connected to said launcher frame and having the arms thereof disposed to receive said missile therebetween, each of said arms terminating in a flanged portion provided with a pair of recesses, one of said recesses being located on the outer-face of said flanged portion in the vicinity of the heel thereof and the second of said recesses being located on the inner-face of said flanged portion in the vicinity of the toe thereof so as to receive said forward and said aft pins therein, respectively, thereby to prevent movement of said missile body in any direction normal to the longitudinal axis of said missile prior to the firing of said missile, and having said outer-faces of said flanged portions contoured such that, when said missile is fired and moves forward causing said yoke to rotate, said flanged portions will swing free of said pins without imparting any moment to said missile.

5. A missile release system for the zero length launching of a missile having two sets of pins mounted to the missile body on the opposite sides thereof and extending beyond the surface thereof, each set of pins consisting of a forward and an aft pin, comprising: a launcher frame; a yoke pivotally connected to said launcher frame and having the arms thereof disposed to receive said missile therebetween, each of said arms terminating in a flanged portion provided with a pair of recesses, one of said recesses being located on the outer-face of said flanged portion in the vicinity of the heel thereof and the second of said recesses being located on the inner-face of said flanged portion in the vicinity of the toe thereof so as to receive said forward and said aft pins therein, respectively, and having said outer-faces of said flanged portions contoured such that, when said missile is fired and moves forward causing said yoke to rotate, said flanged portions will swing free of said pins without imparting any moment to said missile; and means for preventing said yoke from rotating in either direction prior to the firing of said missile thereby to restrain said missile from movement in any direction with respect to said launcher frame, said means being operable to permit the forward rotation of said yoke upon the firing of said missile.

6. A missile release system for the zero length launching of a missile having two sets of pins mounted to the missile body on the opposite sides thereof and extending beyond the surface thereof, each set of pins consisting of a forward and an aft pin, comprising: a launcher frame; a yoke pivotally connected to said launcher frame and having the arms thereof disposed to receive said missile therebetween, each of said arms terminating in a flanged portion provided with a pair of recesses, one of said recesses being located on the outer-face of said flanged portion in the vicinity of the heel thereof and the second of said recesses being located on the inner-face of said flanged portion in the vicinity of the toe thereof so as to receive said forward and said aft pins therein, respectively, and having said outer-faces of said flanged portions contoured such that, when said missile is fired and moves forward causing said yoke to rotate, said flanged portions will swing free of said pins without imparting any moment to said missile; means for preventing said yoke from rotating in either direction prior to the firing of said missile thereby to restrain said missile from movement in any direction with respect to said launcher frame, said means being operable to permit the forward rotation of said yoke upon the firing of said missile; and a second means acting against the tail section of said missile to further support said missile from movement in any direction normal to the longitudinal axis of said missile and so as to permit the forward movement of said missile upon the firing of said missile.

7. A missile release system for the zero length launching of a missile having two sets of pins mounted to the missile body on the opposite sides thereof and extending beyond the surface thereof, each set of pins consisting of a forward and an aft pin, comprising: a launcher frame; a yoke pivotally connected to said launcher frame and having the arms thereof disposed to receive said missile therebetween, each of said arms terminating in a flanged portion provided with a pair of recesses, one of said recesses being located on the outer-face of said flanged portion in the vicinity of the heel thereof and the second of said recesses being located on the inner-face of said flanged portion in the vicinity of the toe thereof so as to receive said forward and said aft pins therein, respectively, and having said outer-faces of said flanged portions contoured such that, when said missile is fired and moves forward causing said yoke to rotate, said flanged portions will swing free of said pins without imparting any moment to said missile; means for preventing said yoke from rotating in either direction prior to the firing of said missile thereby to restrain said missile from movement in any direction with respect to said launcher frame, said means being operable to permit the forward rotation of said yoke upon the firing of said missile; and a second means cooperating with said yoke to cause said yoke to rotate out of the flight path of the missile tail fins as said missile moves forward upon being fired.

8. A missile release system for launching a missile having two sets of pins mounted to the missile body on the opposite sides thereof and extending beyond the surface thereof, each set of pins consisting of a forward and an aft pin, comprising: a launcher frame; a yoke pivotally connected to said launcher frame and having the arms thereof disposed to receive said missile therebetween, each of said arms terminating in a flanged portion provided with a pair of recesses, one of said recesses being located on the outer-face of said flanged portion in the vicinity of the heel thereof and the second of said recesses being located on the inner-face of said flanged portion in the vicinity of the toe thereof so as to receive said forward and said aft pins therein, respectively, and having said outer-faces of said flanged portions contoured such that, when said missile is fired and moves forward causing said yoke to rotate, said flanged portions will swing free of said pins; a crank arm rigidly fixed to said yoke; a lever having one end thereof pivotally mounted to said launcher frame; a rod having one end thereof pivotally connected to said crank arm and the other end thereof pivotally connected to said lever; a second crank arm rigidly fixed to said yoke; a cylinder having one end thereof pivotally mounted to said launcher frame; a piston slidably mounted within said cylinder; a piston rod having one end thereof attached to said piston and the other end thereof extending through said cylinder and pivotally connected to said second crank arm; a spring restrained in said cylinder so as to exert a force against said piston, said force acting through said piston rod and said second crank arm in a manner tending to rotate said yoke in a forward direction with respect to said missile; a pair of stops disposed on said launcher frame; means for exerting a second force against said lever, said second force acting through said rod and said first crank arm to rotate said yoke in an aft direction with respect to said missile to seat said arms of said yoke against said pair of stops, thereby to prevent any movement of said missile with respect to said launcher frame prior to the firing of said missile, said means being operable to permit the forward rotation of said yoke upon the firing of said missile; and a plug seating within the exhaust chamber of said missile and slidably connected to said launcher frame, thereby to further support said missile from movement in any direction normal to the longitudinal axis of said missile.

9. In a missile release system for the zero length launching of a missile having two sets of pins mounted to the missile body on the opposite sides thereof and extending beyond the surface thereof, each set of pins consisting of a forward and an aft pin, the improvement including a yoke comprising a pair of arms, said missile being recessed between said arms of said yoke, each of said arms terminating in a flanged portion provided with a pair of recesses, one of said recesses being located on the outer-face of said flanged portion in the vicinity of the heel thereof and the second of said recesses being located on the inner-face of said flanged portion in the vicinity of the toe thereof, to releasably engage said forward and said aft pins therein, respectively.

References Cited by the Examiner
UNITED STATES PATENTS

| | | | |
|---|---|---|---|
| 2,481,542 | 9/49 | Schuyler | 89—1.7 |
| 2,604,014 | 7/52 | Walker et al. | 89—1.7 |
| 2,729,406 | 1/56 | Bush | 89—1.7 |
| 2,735,391 | 2/56 | Bushers | 89—1.7 |
| 2,831,400 | 4/58 | Hosli | 89—1.7 |
| 2,843,020 | 7/58 | Bertagna et al. | 89—1.7 |
| 3,008,376 | 11/61 | Brunow et al. | 89—1.7 |
| 3,049,976 | 8/62 | Hereth et al. | 89—1.7 |

BENJAMIN A. BORCHELT, *Primary Examiner.*

SAMUEL BOYD, *Examiner.*